United States Patent
Baldemair et al.

(10) Patent No.: US 11,438,198 B2
(45) Date of Patent: Sep. 6, 2022

(54) PULSE-SHAPING SIGNALING FOR HIGH FREQUENCY RADIO NETWORKS

(71) Applicant: Telefonaktiebolaget LM Ericsson (publ), Stockholm (SE)

(72) Inventors: Robert Baldemair, Solna (SE); Mehrnaz Afshang, San Jose, CA (US); Jung-Fu Cheng, Fremont, CA (US); Ning He, Sollentuna (SE); Dennis Hui, Sunnyvale, CA (US); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/700,511

(22) Filed: Dec. 2, 2019

(65) Prior Publication Data
US 2021/0167998 A1    Jun. 3, 2021

(51) Int. Cl.
*H04L 27/20* (2006.01)
*H04L 25/03* (2006.01)

(52) U.S. Cl.
CPC .............................. *H04L 25/0384* (2013.01)

(58) Field of Classification Search
CPC ............ H04L 25/0384; H04L 27/2627; H04L 27/2646
See application file for complete search history.

(56) References Cited

U.S. PATENT DOCUMENTS

| 10,171,129 B1* | 1/2019 | Hammerschmidt ................ G01S 13/0209 |
| 2007/0177689 A1 | 8/2007 | Beadle et al. |
| 2015/0110216 A1* | 4/2015 | Bajcsy ............... H04L 27/2654 375/348 |
| 2017/0331663 A1* | 11/2017 | Moradi ............... H04L 27/3494 |
| 2019/0036657 A1* | 1/2019 | Zhao ....................... H04B 1/38 |
| 2019/0081770 A1 | 3/2019 | Zhao et al. |
| 2020/0244501 A1* | 7/2020 | Shattil ................. H04L 27/2605 |

FOREIGN PATENT DOCUMENTS

EP    3429148 A1    1/2019

OTHER PUBLICATIONS

International Search Report and Written Opinion dated Sep. 15, 2020 for International Application No. PCT/SE2020/050591 filed Jun. 9, 2020, consisting of 12-pages.

* cited by examiner

*Primary Examiner* — Syed Haider
(74) *Attorney, Agent, or Firm* — Christopher & Weisberg, P.A.

(57) ABSTRACT

There is disclosed a method of operating a radio node in a wireless communication network. The method includes communicating utilising signaling, wherein communicating utilising signaling is based on performing pulse-shaping pertaining to the signaling, wherein pulse-shaping is based on a pulse-shaping indication. The disclosure also pertains to related devices and methods.

19 Claims, 4 Drawing Sheets

PULSE-SHAPING SIGNALING FOR HIGH FREQUENCY RADIO NETWORKS

TECHNICAL FIELD

This disclosure pertains to wireless communication technology, in particular for high frequencies.

BACKGROUND

For future wireless communication systems, use of higher frequencies are considered, which allow large bandwidths to be used for communication. However, the use of such higher frequencies brings new problems, e.g. regarding physical properties and timing.

SUMMARY

It is an object of this disclosure to provide improved approaches of handling wireless communication, in particular to improve time domain behaviour. The approaches are particularly suitable for millimeter wave communication, in particular for radio carrier frequencies around and/or above 52.6 GHz, which may be considered high radio frequencies and/or millimeter waves. The carrier frequency/ies may be between 52.6 and 140 GHz, e.g. with a lower border between 52.6, 55, 60, 71 GHz and/or a higher border between 71, 72, 90, 114, 140 GHz or higher, in particular between 55 and 90 GHz, or between 60 and 72 GHz. The carrier frequency may in particular refer to a center frequency or maximum frequency of the carrier. The radio nodes and/or network described herein may operate in wideband, e.g. with a carrier bandwidth of 1 GHz or more, or 2 GHz or more, or even larger. In some cases, operation may be based on an OFDM waveform or a SC-FDM waveform (e.g., downlink and/or uplink). However, operation based on a single carrier waveform, e.g. SC-FDE, may be considered for downlink and/or uplink. In general, different waveforms may be used for different communication directions. Communicating using or utilising a carrier and/or beam may correspond to operating using or utilising the carrier and/or beam, and/or may comprise transmitting on the carrier and/or beam and/or receiving on the carrier and/or beam.

The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. However, the approaches may also be used with other RAT, for example future 5.5G or 6G systems or IEEE based systems.

There is disclosed a method of operating a radio node in a wireless communication network. The method comprises communicating utilising signaling, wherein communicating utilising signaling is based on performing pulse-shaping pertaining to the signaling, and wherein pulse-shaping is based on a pulse-shaping indication.

Moreover, there is disclosed a radio node for a wireless communication network. The radio node is adapted for communicating utilising signaling, wherein communicating utilising signaling is based on performing pulse-shaping pertaining to the signaling, wherein pulse-shaping is based on a pulse-shaping indication. The radio node may comprise, and/or be adapted to utilise, processing circuitry and/or radio circuitry, in particular a transmitter and/or receiver and/or transceiver, in particular for communicating and/or beamforming and/or for receiving or transmitting the pulse-shaping indication.

The radio node may be a wireless device, or in some cases a network node. The pulse-shaping indication may be transmitted by a network node and/or received by a wireless device, or in some cases vice versa. The pulse-shaping indication may indicate whether to use pulse-shaping for transmitting or receiving. A wireless device may transmit a pulse-shaping indication to indicate to a network node that its transmission is pulse shaped, e.g. utilising uplink control information and/or a measurement report and/or a control field associated to a transmission. In other variants, the network node may transmit the pulse-shaping indication to indicate to a wireless device whether to use pulse-shaping for transmission and/or reception of signaling. The pulse-shaping indication may explicitly and/or implicitly indicate whether to use pulse-shaping and/or which parameters to use for pulse-shaping. The pulse-shaping indication may comprise one or more sub-components or sub-indications, e.g., one or more parameters and/or variables and/or bit-fields. A network node may determine the pulse-shaping indication itself, and/or read it from a memory, e.g. for its own transmission or reception of signaling.

In general, the pulse-shaping indication may be transmitted by a network node, and/or received by a wireless device. Thus, centralised control may be provided in the network.

It may be considered that the pulse-shaping indication is transmitted with control signaling, in particular physical layer signaling and/or higher layer signaling. Physical layer signaling may be on a physical control channel, e.g. PDCCH, or PUCCH or PSCCH, depending on the transmitting node, and/or may comprise control information like DCI or UCI or SCI. Higher layer signaling may in general be MAC signaling and/or RRC signaling, which may for example be transmitted on a data channel, e.g. PDSCH or PUSCH or PSSCH. Different parts or sub-indications of the pulse-shaping indication may be in different types of signaling and/or different messages and/or on different channels.

In some cases, the pulse-shaping indication may be transmitted with control signaling indexing a table configured to the radio node; this may in particular be the case if the for the wireless device receiving the control signaling. The control signaling may be physical layer signaling. The table may be configured to the radio node by the network, e.g. a network node, for example with higher layer signaling. In some cases, the table may be predefined, e.g. according to a standard, and/or be configurable (e.g., to override a predefined table).

It may be considered that the pulse shaping indication may correspond to a modulation indication indicating the modulation and/or modulation order used for the signaling. For some modulations or modulation orders or types, there may be a rule, e.g. a predefined or configured or configurable rule or set of rules whether pulse-shaping is to be used and/or which pulse-shaping parameter/s is or are to be used.

The pulse-shaping indication may indicate a first pulse-shaping parameter and/or a second pulse-shaping parameter, e.g. a beta or gamma as described herein. The parameter/s may be indicated implicitly or explicitly.

It may be considered that the pulse-shaping indication may index a configured or configurable or predefined table indicating a first pulse-shaping parameter and/or a second pulse-shaping parameter. Thus, low overhead is needed for pointing to the parameter/s to be used. The pulse-shaping indication in this case may in particular be included in physical layer signaling, e.g. on a PDCCH and/or in a DCI message.

The pulse-shaping indication (or a sub-indication thereof) may be represented in a bit field in a control information message, e.g. a DCI message (also simply referred to as DCI). The bit field may comprise or consist of one or more bits. In a variant with 1 bit, it may indicate whether or not to use pulse-shaping (e.g., according to configured or predefined or configurable parameter/s). With more than one bit, it may indicate (e.g., explicitly), or index to a table indicating, one or more parameters.

The pulse-shaping indication may be represented by a signaling characteristic of signaling, e.g. of signaling scheduling transmission or reception of signaling utilising pulse-shaping (or not), or a signaling characteristic of received signaling. A signaling characteristic may for example indicate a channel for the signaling (e.g., a physical channel, like a PDCCH or PUCCH or PDSCH or PUSCH or PSCCH or PSSCH), or the type of channel (e.g., control channel like PUCCH or PDCCH or PSCCH or data channel like PDSCH or PUSCH or PSSCH). Alternatively, or additionally, the signaling characteristic may indicate a search space and/or resources (e.g., time/frequency resources) for reception of signaling and/or modulation and/or MCS (modulation and coding scheme). For example, PDCCH or PUCCH may be transmitted with pulse-shaping (e.g., with low modulation), and reception of a PDCCH may indicate to a wireless device may indicate pulse-shaping for processing the PDCCH; in some cases, scheduling a PUCCH may indicate that pulse-shaping is to be used for transmitting the PUCCH. Other examples of signaling characteristic are format of a DCI or message, and/or payload size and/or resource ID (of resources carrying the signaling/message).

The approaches described herein allow use of pulse-shaping in a network in a controlled manner, such that transmitter and receiver agree on whether to use pulse-shaping or not. Accordingly, improved signaling is facilitated, in particular with improved time domain behaviour, respectively with improved PAPR. Specifically, the impulse response of a signal may be significantly reduced. The approaches may in particular implement processing as indicated in the detailed description. Some part of the transmission bandwidth may be used for redundant signaling (copies of some subcarriers or samples), providing a smoother signaling form with more compact time domain extension.

Communicating may comprise transmitting or receiving. It may be considered that communicating is based on a SC-FDM based waveform, and/or corresponds to a Frequency Domain Filtered (FDF) DFTS-FDM waveform. However, the approaches may be applied to a Single Carrier based waveform, e.g. a SC-FDM or SC-FDE-waveform. It should be noted that SC-FDM may be considered DFT-spread FDM, such that SC-FDM and DFTS-FDM may be used interchangeably. Pulse shaping may also be referred to as pulse forming, or as filtering, in particular Frequency Domain Filtering (FDF).

It may be considered that performing pulse-shaping corresponds to performing pulse-shaping based on an input representing modulation symbols distributed over a first frequency range. The first frequency range may represent a number of subcarriers, e.g. Nc subcarriers, and/or a transmission bandwidth. The transmission bandwidth may correspond to the number of subcarriers or samples used for an IFFT operating on a signaling frequency distribution.

In general, performing pulse-shaping may correspond to performing pulse-shaping based on a periodic expansion in frequency domain, and/or mapping an input distribution of modulation symbols over an input bandwidth to a target bandwidth (which may be larger than the input bandwidth), e.g. with repetition of some subcarrier sample values. The distribution may be after a FFT has been performed. The periodic expansion may copy or repeat subcarriers (and/or their sample value) from a frequency distribution of modulation symbols (e.g., after an FFT) over a frequency range of a number of subcarriers to additional subcarrier neighboring in frequency domain, e.g. at the higher frequency end and/or the lower frequency end. Thus, a target bandwidth may be used, which may correspond to a transmission bandwidth used for transmitting the signaling carrying the modulation symbols, or may be an intermediate bandwidth, which may be changed, e.g. compressed, to arrive at a transmission bandwidth. Pulse shaping may be performed with bandwidth expansion, or without bandwidth expansion (in which case the signaling to be transmitted may be mapped and/or provided such that it can be fit within the transmission and/or target bandwidth with the corresponding pulse-shaping parameter or parameters, e.g. beta2 and/or gamma).

The radio node may be a transmitting radio node, transmitting the signaling, e.g. a network node, e.g. a gNodeB or IAB node or other node; in some cases, it may be a wireless device or terminal or UE. In particular, it may be considered that the radio node is a network node transmitting signaling. There may be considered variants in which the radio node is a receiving node, e.g. a wireless device or terminal or UE, but cases in which it is a network node like a gNodeB or IAB node or other node may be considered. In some variants, the radio node is a wireless device receiving the signaling. The radio node may generally be considered to be adapted for (e.g., selectively) utilising different modulations (e.g., for transmitting and/or receiving), e.g. according to a set of modulations.

In some cases, it may be considered that pulse-shaping is performed based on a modulation of the signaling and/or an indication indicating the modulation of the signaling. The modulation may be represented or parametrised by a modulation type (e.g., BPSK or BPSK-based, or QPSK or QPSK-based, or QAM, or nQAM, with n=8, 16, 32, 64, . . . ) or modulation order or modulation index. The modulation order may indicate the number CP of constellation points available for a given modulation type (e.g., 2 for BPSK or n for nQAM), and may be represented by CP, or by NP, with $CP=2^{NP}$. The modulation index may correspond to pointer or index indication which modulation type or order to use, e.g. according to a table, which may be configured or predefined for a radio node. It may be considered that for a first set of modulations (or modulation types or orders or indices) pulse-shaping is performed, and for a second set of modulations it is not performed, and/or that different first and/or second pulse shaping parameters are used for different sets and/or modulations (or modulation types or order or indices). The first sets and second set or further sets may be subsets of the set of modulations the radio node is capable of or adapted for using. The first set may correspond to low modulations, the second set to high modulations; a set may generally comprise one or more modulations. A low modulation may generally be any modulation with modulation order corresponding to, or lower than nQAM (e.g., for n=8 or 16), or QPSK, or BPSK. High modulation may correspond to any modulation with a higher order than low modulation.

The signaling may in particular control information signaling, e.g. on a control channel like a physical control channel, e.g. a PUCCH or PDCCH or PSCCH. Such channels may be transmitted with low modulation and particularly benefit from the pulse-shaping.

In some cases, pulse-shaping may be based on a first pulse-shaping parameter (beta), which may indicate a roll-off used for pulse-shaping and/or a bandwidth expansion and/or which may indicate subcarriers to be pulse-shaped. The first pulse shaping parameter may be implemented as a beta1 or beta2 value described herein, e.g. indicating the subcarriers to be filtered or expanded or copied relative to the number of subcarriers with associated modulation symbols (also considered an input or original bandwidth) provided for pulse shaping, or relative to a target bandwidth larger than the input bandwidth.

It may be considered that pulse-shaping may be based on a second pulse-shaping parameter gamma, which may indicate a bandwidth compressing. This parameter may be in addition to a first pulse-shaping parameter. Gamma may be selected as a function or factor, e.g. such that input bandwidth and transmission bandwidth are equal, with a target bandwidth (an intermediate bandwidth) larger than the input bandwidth.

In general, for one or more modulations out of a set of modulations, pulse-shaping may be performed, e.g. for a low modulation/s; and/or for one or more modulations of the set of modulations, no pulse-shaping may be performed, e.g. for high modulation/s.

It may be considered that a first pulse-shaping (beta) parameter and/or a second pulse-shaping parameter (gamma) is dependent on the modulation and/or modulation indication. For example, beta may be lower for lower modulations (e.g. order or index) than for higher modulations, e.g. such that for at least one modulation with a modulation order, beta is lower than for a second modulation with higher modulation order (beta may be larger than zero for both). Thus, improved adaptability is provided.

In some variants, pulse-shaping may be performed such that modulation symbols associated to a first set of subcarriers are not pulse-shaped, and modulation symbols associated to a second set of subcarriers are pulse-shaped. The first set of subcarriers may be those that are not copied, and/or may be located in the middle of the frequency distribution.

Pulse-shaping a modulation symbol associated to a first subcarrier may in general comprise mapping the modulation symbol (or a FFT sample corresponding thereto) to an associated second subcarrier, and/or applying a shaping operation regarding the power and/or amplitude and/or phase of the modulation symbol (or a FFT sample corresponding thereto) on the first subcarrier and the second subcarrier, wherein the shaping operation may be according to a shaping function. The shaping function may be a filter or filtering function, in particular a Nyquist filter. The first and second subcarriers may be at different ends of the frequency distribution, with one or more subcarriers (in particular unfiltered subcarriers) in between. The shaping or filtering may be symmetric (e.g., mirror symmetric to the center of the frequency distribution in frequency domain). The shaping or filtering may correspond to multiplying the sample value of the subcarrier/s with a factor smaller than one, wherein for the high frequency end of the distribution, the factor may decrease with increasing frequency, and/or for the low frequency end, the factor may decrease with decreasing frequency. Such decrease may be according to a filter or shaping function. The low frequency end and high frequency end may comprise the same number of subcarriers, and/or a pair of low end subcarrier and a high end subcarrier may correspond to the same sample and/or modulation symbol. Between the high frequency end and low frequency end there may a part of the distribution which is unfiltered or with singular subcarriers (with no copy or repetition of the sample) and/or filtered with a factor of 1. The low frequency end and/or high frequency end may comprise Np/2 subcarriers each.

In general, it may be considered that pulse-shaping is performed based on a Nyquist-filter. This allows smooth transition while providing information redundancy regarding the shaped part.

It may be considered that pulse-shaping is performed based on periodically extending a frequency distribution of modulation symbols over a first number of subcarrier to a larger, second number of subcarriers, wherein a subset of the first number of subcarriers from one end of the frequency distribution is appended at the other end of the first number of subcarriers. This allows mirroring of samples for information redundancy.

A signaling distribution may indicate a distribution of modulation symbols or samples (e.g., after FFT) or modified samples over frequency, e.g. over a limited bandwidth, for example an input bandwidth or target bandwidth or transmission bandwidth. The distribution may pertain to subcarriers representing frequency units. Thus, a signaling distribution may be referred to as frequency distribution or subcarrier distribution or simply distribution. To each subcarrier, there may be associated a distribution value, e.g. a sample and/or power and/or amplitude and/or phase; the distribution may in particular represent a power spectral density (PSD). Shaping or filtering may comprise modifying the sample value; shaping or filtering a subcarrier may be understood to refer to shaping or filtering the sample value. The sample value may indicate the (relative) transmission power for the subcarrier, e.g., for transmitting or receiving the signaling. Pulse-shaping a distribution may comprise pulse-shaping one or more subcarriers or samples.

In some variants, communicating may be based on a numerology and/or an SC-FDM based waveform (including a FDF-DFTS-FDM based waveform). Such waveforms may utilise a cyclic prefix and/or benefit particularly from the described approaches. Communicating may comprise and/or be based on beamforming, e.g. transmission beamforming and/or reception beamforming, respectively. It may be considered that a beam is produced by performing analog beamforming to provide the beam, e.g. a beam corresponding to a reference beam. Thus, signaling may be adapted, e.g. based on movement of the communication partner. A beam may for example be produced by performing analog beamforming to provide a beam corresponding to a reference beam. This allows efficient postprocessing of a digitally formed beam, without requiring changes to a digital beamforming chain and/or without requiring changes to a standard defining beam forming precoders. In general, a beam may be produced by hybrid beamforming, and/or by digital beamforming, e.g. based on a precoder. This facilitates easy processing of beams, and/or limits the number of power amplifiers/ADC/DCA required for antenna arrangements. It may be considered that a beam is produced by hybrid beamforming, e.g. by analog beamforming performed on a beam representation or beam formed based on digital beamforming. Monitoring and/or performing cell search may be based on reception beamforming, e.g. analog or digital or hybrid reception beamforming.

In general, communicating may comprise utilising a numerology and/or be based on an SC-FDM based waveform (also referred to as DFTS-FDM). The numerology may determine the length of a symbol time interval and/or the duration of a cyclic prefix. The approaches described herein are particularly suitable to SC-FDM, to ensure orthogonality, in particular subcarrier orthogonality, in corresponding systems, but may be used for other waveforms. Communicating may comprise utilising a waveform with cyclic prefix. The cyclic prefix may be based on a numerology, and may help keeping signaling orthogonal. Communicating may comprise, and/or be based on performing cell search, e.g. for a wireless device or terminal, or may comprise transmitting cell identifying signaling and/or a selection indication, based on which a radio node receiving the selection indication may select a signaling bandwidth from a set of signaling bandwidths for performing cell search.

There is also described a program product comprising instructions causing processing circuitry to control and/or perform a method as described herein. Moreover, a carrier medium arrangement carrying and/or storing a program product as described herein is considered.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
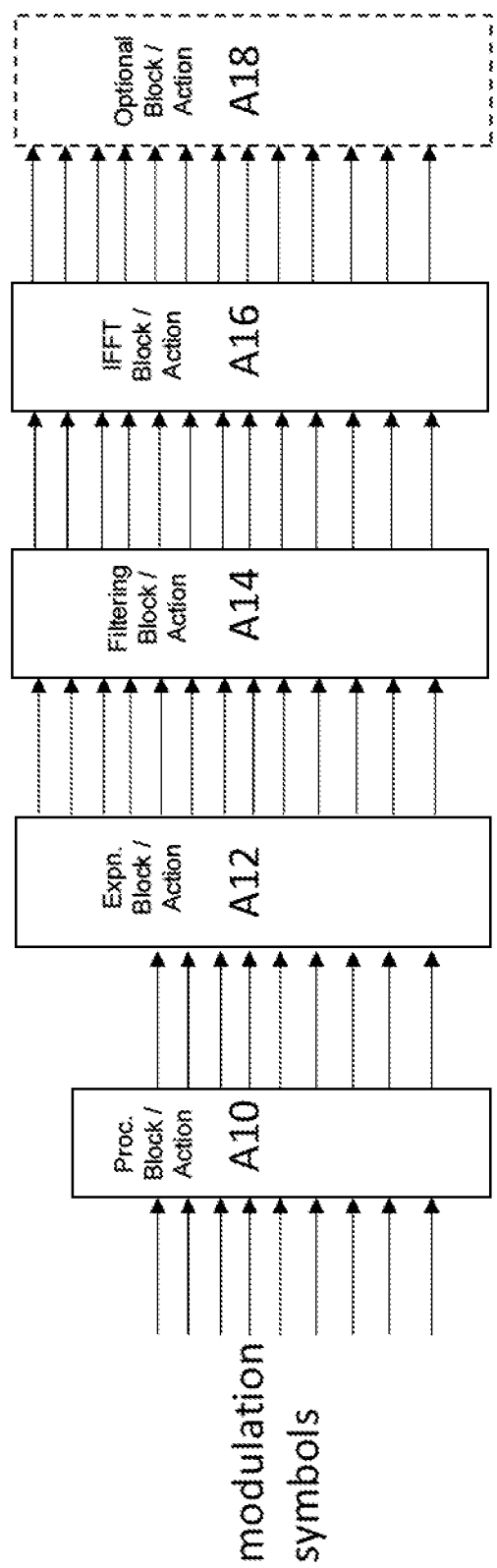
FIG. 1, showing an exemplary processing diagram.

FIG. 1 shows an exemplary processing diagram for a transmitting radio node transmitting signaling based on a FDF-DFTS-FDM waveform as an example of pulse-shaping. DFTS-FDM (also SC-FDM) waveforms may be considered to map modulation symbols to subcarriers for transmission. Each subcarrier may represent a frequency interval (subcarrier spacing, SCS) determined by the numerology used. It should be noted that corresponding filtering in time domain may be considered to achieve pulse-shaping. The blocks and actions shown may for example be implemented in processing circuitry and/or radio circuitry, for example for baseband processing.

As an input there are provided (e.g., Nc) modulation symbols to be transmitted, e.g. representing higher layer information and/or physical layer signaling. A modulation symbol may represent some information, e.g. one or more bits, according to the constellation it represents and/or depending on the modulation scheme and/or order used. In a processing block (and/or action) A10, which may be adapted to receive the symbols, the symbols may be mapped to Nc subcarriers or samples in a Nc-point FFT, providing a sequence of Nc samples (which may be associated to subcarriers).

An expansion block or action A12 may be adapted to receive Nc samples/FFT result and to expand it to Nbw subcarriers/samples and/or onto a target bandwidth. The expansion may be periodic expansion, in which samples at one border of the Nc result (e.g., left/lower frequency border or right/higher frequency border) are copied and/or repeated and/or mapped to the other border such that the sequence of Nc samples is at least partly repeated. The expansion may be parametrised by a first pulse-shaping parameter (e.g., beta or beta1), which may indicate in this example the relative expansion of subcarrier and/or samples relative to Nc (or the corresponding frequency bandwidth). Accordingly, there may hold Nbw=Nc×(1+beta1); wherein for example Nc×beta1 samples are repeated/periodically extended. Beta/beta1 may for example be 0.3, corresponding to a bandwidth expansion (from Nc subcarriers to Nbw subcarriers) of 30%; using a beta1 parameter may be considered to use bandwidth expansion or be "with expansion". This beta parameter may indicate the relative number of subcarriers to the original Nc (Np/2) to be subject to filtering. Alternatively, there may be provided a parameter (beta or beta2) as first pulse-shaping parameter, which may indicate the ratio of periodically extended samples or subcarriers or number of subcarriers (e.g., at one end of the frequency distribution) to be subject to filtering relative to the target bandwidth and/or Nbw. This case may be considered as a case "without expansion". With bandwidth expansion, the total number of non-zero subcarriers (in the target or expanded bandwidth) may correspond to (1+beta)×Nc, wherein beta may be beta1 and/or be referred to as roll-off factor. The PSD of the central (Nu) subcarriers may be flat, the rest of the subcarrier may be filtered/shaped. Without expansion, the input bandwidth may be scaled with 1/(1+beta) such that the target bandwidth may be smaller, e.g. corresponding to a transmission bandwidth with smaller size in frequency domain.

In the target bandwidth, in general, there may be Nu samples or subcarriers that are singular, and a number Np subcarriers that are copied or periodically expanded (such that Np/2 corresponds to the original subcarriers of Nc that are repeated or copied or expanded; it may hold Nc=Nu+Np/2). Np/2 and/or Np may be smaller than Nu (e.g., depending on beta); the Np subcarriers may be the Np subcarriers from the Nc subcarriers or samples with the lowest frequency/number copied to or repeated at the high frequency end of the target bandwidth, or vice versa (Np may comprise subcarriers both at the lower frequency end and the higher frequency end, and/or on both sides of the Nu subcarriers). In some variants, the periodic expansion may be represented by copying the Nc subcarriers periodically multiple times (such that the block of Nc subcarriers is repeated or copied blockwise), and "cutting out" Nbw continuous subcarriers, with Nbw>Nc, e.g. depending on beta (beta1 or beta2). In this case, there may be no correspondence between the subcarriers at the lower end and the ones at the higher end, but each subcarrier in the filtered region may correspond to another subcarrier in the target bandwidth.

In a filtering block or action A14 frequency domain filtering may be performed. The filtering may shape or form the periodic expanded subcarriers Np according to a filtering function, e.g. utilising a Nyquist filter. The filter may correspond to a roll-off factor, which may correspond to beta or a function (e.g. power of) beta, and/or acting on the expanded subcarriers Np. Filtering may be mirror symmetric regarding the Np/2 subcarriers at each end. The filtering may be such that the sample of a subcarrier filtered is multiplied with a filtering factor <1, wherein the factor may decrease towards the respective border in frequency space (such that the outmost samples are multiplied with the smallest factors). The filter may be of order $p^{-1}$ or $p^{-2}$; the sample value p filtered, respectively the frequency distribution of samples may correspond to power and/or amplitude and/or phase of signaling to be transmitted on the subcarrier. The Nu singular subcarriers may be unfiltered, or in some cases filtered with a larger factor (leading to less filtering effect). Filtering block or action A14 may be considered to provide a filtered (frequency domain filtered) subcarrier distribution of samples for transmission. It may be considered that the filtered distribution is mapped to, and/or corresponds to Nbw subcarriers, e.g. if the transmission bandwidth (the subcarriers on which signaling is to be transmitted) is at least equal to, or is larger than Nbw (e.g., including some guard band/s). In other cases, the filtered distribution may be mapped to another bandwidth, e.g. compressed using a compression factor or function gamma, which may be considered a second pulse shaping parameter, mapping the distribution from Nbw subcarriers or samples to Nf subcarrier or samples, wherein in particular Nf<Nbw may hold. In some cases, Nf=Nc. In the example shown in FIG. 1, no compression is performed. In an IFFT block or action A16, the distribution may be subjected to an IFFT operation, for example to provide a time domain representation. The IFFT in the example is performed on Nbw subcarriers, but may in other cases be performed on the number of subcarriers or samples associated to the distribution. There may be additional blocks or actions for processing, e.g. to add cyclic prefix or guard interval, and/or to provide further filtering like wideband filtering for transmission, represented by optional block or action A18. It should be noted that A12 and A14, or A14 and A16, or A12, A14 and A16, may be combined in one block or action, e.g. to be performed in the same block and/or simultaneously. For reception, analogous processing may be considered, e.g. in reverse.

Figure 2:
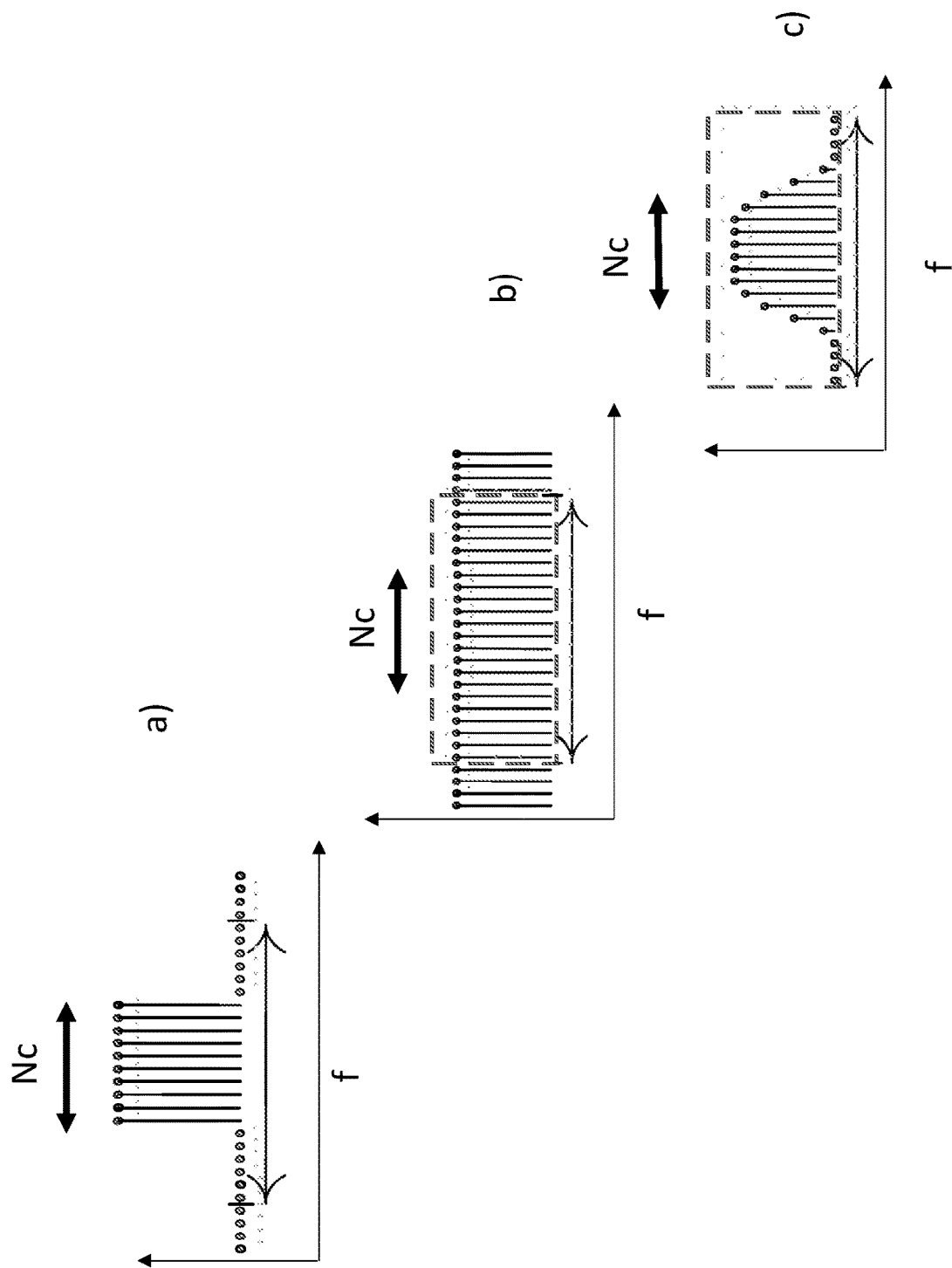
FIG. 2, showing exemplary frequency domain graphs after different processing actions.

FIG. 2, graphs a) to c), shows exemplary distributions at different processing stages. In FIG. 2, graph a), the frequency distribution received after FFT (A10) is shown, with Nc subcarriers associated to corresponding sample with constant representation. The arrows at the bottom of graphs a) to c) in FIG. 2 indicate the target bandwidth with Nbw subcarriers. Subcarriers outside of Nc are zeroed in FIG. 2, graph a) (or disregarded). FIG. 2, graph b), shows the distribution after periodic expansion by a factor beta, e.g. according to A12. In this representation, Nc may be copied blockwise to the left and to the right, such that the lower frequency subcarriers within the target bandwidth (indicated by arrow and dashed block) correspond to the higher frequency end of the Nc subcarriers, and the higher frequency subcarriers within the target bandwidth correspond to the lower frequency end of the Nc subcarriers. However, an approach in which the higher and lower end within the target bandwidth represent the same Np/2 subcarriers may be considered, e.g. the lower Np/2 subcarriers of the Nc subcarriers, or the higher Np/2, which may be considered to provide a mirroring effect. FIG. 2, graph c), shows the filtered distribution, after a Nyquist filter has been used on the expanded distribution. In this example, some subcarriers Nu in the middle of Nc are unfiltered, while to the left and right in frequency domain, the filter provides a decreasing factor for the distribution, such that the distributions rolls off to frequency borders. This generally leads to a shorter time-response (shorter impulse response) when receiving, concentrating the signaling in time domain. Accordingly, time delay effects which may spread out the signaling to be longer than the cyclic prefix or guard time (or have substantial contributions outside of the associated time interval) may be lowered, improving signal quality. A receiver will perform analogous reversing operations when receiving the transmitted signaling. If the lower frequency end is mirrored at the higher frequency end of the distribution, the respective subcarriers each will be transmitted with lower amplitude or power, but in the final processing, may be reliably extracted due to being doubly represented. Without mirroring, each filtered subcarrier will have a corresponding subcarrier in the Nc subcarriers, providing an additional contribution for reconstructing the signal. In the examples of FIG. 2, the target bandwidth may be used for transmission; cases with compression may be considered. In some cases, Nc subcarriers or modulation symbols may be provided such that they fit into a transmission bandwidth using a beta2 parameter.

The effect of the suggested pulse shaping may be dependent on the modulation used for signaling; it may be more pronounced for lower modulation orders. Accordingly, it is proposed to perform pulse shaping based on the modulation used for transmission, e.g. use pulse shaping for low modulations (e.g., BPSK or BPSK based, QPSK or QAM), and not for higher modulations. Beta and/or gamma may be dependent on the modulation. PAPR may be lowered, and/or time domain behaviour of signaling may be optimised. The approaches may be considered similar or equivalent to cyclic convolution with QAM symbols spaced out further in time (e.g., with $1/(N_c \Delta f_{subcarrier})$.

Figure 3:
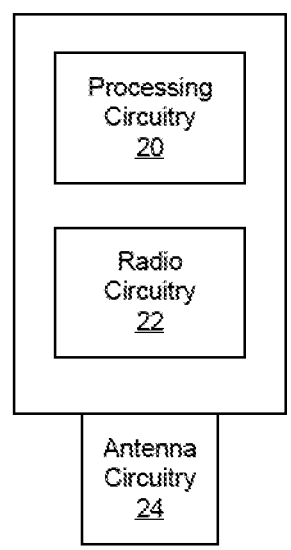
FIG. 3, showing an exemplary radio node.

FIG. 3 schematically shows a radio node, in particular a wireless device or terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable, to a power supply.

Figure 4:
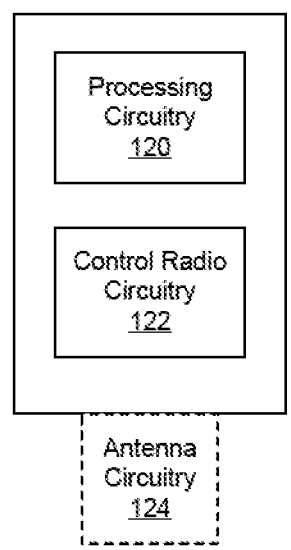
FIG. 4, showing another exemplary radio node.

FIG. 4 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

In some variants, reference signaling may be and/or comprise CSI-RS, e.g. transmitted by the network node. In other variants, the reference signaling may be transmitted by a UE, e.g. to a network node or other UE, in which case it may comprise and/or be Sounding Reference Signaling. Other, e.g. new, forms of reference signaling may be considered and/or used. In general, a modulation symbol of reference signaling respectively a resource element carrying it may be associated to a cyclic prefix.

Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. Reference signaling may be associated to control signaling and/or data signaling, e.g. DM-RS and/or PT-RS.

Reference signaling, for example, may comprise DM-RS and/or pilot signaling and/or discovery signaling and/or synchronisation signaling and/or sounding signaling and/or phase tracking signaling and/or cell-specific reference signaling and/or user-specific signaling, in particular CSI-RS. Reference signaling in general may be signaling with one or more signaling characteristics, in particular transmission power and/or sequence of modulation symbols and/or resource distribution and/or phase distribution known to the receiver. Thus, the receiver can use the reference signaling as a reference and/or for training and/or for compensation. The receiver can be informed about the reference signaling by the transmitter, e.g. being configured and/or signaling with control signaling, in particular physical layer signaling and/or higher layer signaling (e.g., DCI and/or RRC signaling), and/or may determine the corresponding information itself, e.g. a network node configuring a UE to transmit reference signaling. Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4, or more symbols, e.g. less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and/or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g. in digital postprocessing, e.g. digital beamforming. A beam may have a solid angle equal to or smaller than 4*pi sr (4*pi correspond to a beam covering all directions), in particular smaller than 2*pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel. Signal strength may be represented by received signal strength, and/or relative signal strength, e.g. in comparison to a reference signal (strength).

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling and/or Single-Carrier based signaling, e.g. SC-FDE signaling, may be considered alternatives).

A radio node may generally be considered a device or node adapted for wireless and/or radio (and/or millimeter wave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g. a relay or backhaul network or an IAB network), and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling.

Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g. in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. an LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time. A control region may be associated, e.g. via configuration and/or determination, to one or more specific UEs and/or formats of PDCCH and/or DCI and/or identifiers, e.g. UE identifiers and/or RNTIs or carrier/cell identifiers, and/or be represented and/or associated to a CORESET and/or a search space.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledge information and/or measurement reporting.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM) or IEEE standards as IEEE 802.11ad or IEEE 802.11ay. While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some Useful Abbreviations Comprise

| Abbreviation | Explanation |
| --- | --- |
| ACK/NACK | Acknowledgment/Negative Acknowledgement |
| ARQ | Automatic Repeat reQuest |
| BER | Bit Error Rate |
| BLER | Block Error Rate |
| BPSK | Binary Phase Shift Keying |
| CAZAC | Constant Amplitude Zero Cross Correlation |
| CB | Code Block |
| CBG | Code Block Group |
| CDM | Code Division Multiplex |
| CM | Cubic Metric |
| CORESET | Control Resource Set |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DFTS-FDM | DFT-spread-FDM |
| DM(-)RS | Demodulation reference signal(ing) |
| eMBB | enhanced Mobile BroadBand |
| FDD | Frequency Division Duplex |
| FDE | Frequency Domain Equalisation |
| FDF | Frequency Domain Filtering |
| FDM | Frequency Division Multiplex |
| HARQ | Hybrid Automatic Repeat Request |
| IAB | Integrated Access and Backhaul |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| PSS | Primary Synchronisation Signal(ing) |
| (P)SSCH | (Physical) Sidelink Shared Channel |

-continued

| Abbreviation | Explanation |
| --- | --- |
| QAM | Quadrature Amplitude Modulation |
| QPSK | Quadrature Phase Shift Keying |
| RAN | Radio Access Network |
| RAT | Radio Access Technology |
| RB | Resource Block |
| RNTI | Radio Network Temporary Identifier |
| RRC | Radio Resource Control |
| RX | Receiver, Reception, Reception-related/side |
| SA | Scheduling Assignment |
| SC-FDE | Single Carrier Frequency Domain Equalisation |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SSS | Secondary Synchronisation Signal(ing) |
| SVD | Singular-value decomposition |
| TB | Transport Block |
| TDD | Time Division Duplex |
| TDM | Time Division Multiplex |
| TX | Transmitter, Transmission, Transmission-related/side |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |
| ZP | Zero-Power, e.g. muted CSI-RS symbol |

Abbreviations may be considered to follow 3GPP usage if applicable.

The invention claimed is:

1. A method of operating a radio node in a wireless communication network, the method comprising:
communicating utilizing signaling, the communicating utilizing signaling being based on performing pulse-shaping pertaining to the signaling, the pulse-shaping pertaining to the signaling being based on a pulse-shaping indication, the pulse shaping indication comprising a signaling characteristic of a control channel being used for communications utilizing signaling between the radio node and at least one of a wireless device and a second node, the signaling characteristic of the control channel comprising at least one of a channel indication and a resource for the signaling, the signaling characteristic indicating a first pulse-shaping parameter and a second pulse-shaping parameter, the second pulse-shaping parameter indicating a bandwidth compression.

2. A radio node for a wireless communication network, the radio node being configured to communicate utilizing signaling, the communicating utilizing signaling being based on performing pulse-shaping pertaining to the signaling, the pulse-shaping pertaining to the signaling being based on a pulse-shaping indication, the pulse shaping indication comprising a signaling characteristic of a control channel being used for communications utilizing signaling between the radio node and at least one of a wireless device and a second node, the signaling characteristic of the control channel comprising at least one of a channel indication and a resource for the signaling, the signaling characteristic indicating a first pulse-shaping parameter and a second pulse-shaping parameter, the second pulse-shaping parameter indicating a bandwidth compression.

3. The method according to claim 1, wherein the pulse-shaping indication is transmitted by a network node.

4. The method according to claim 1, wherein the pulse-shaping indication is transmitted with control signaling, the control signaling including at least one of physical layer signaling and higher layer signaling.

5. The method according to claim 1, wherein the pulse-shaping indication is transmitted with control signaling indexing a table configured to the radio node.

6. The method according to claim 1, wherein the pulse shaping indication corresponds to a modulation indication indicating at least one of modulation and modulation order used for the signaling.

7. The method according to claim 1, wherein the pulse-shaping indication indexes one of a configured, a configurable and a predefined table indicating at least one of the first pulse-shaping parameter and the second pulse-shaping parameter.

8. A non-transitory computer storage medium storing an executable computer program comprising instructions that, when executed, cause processing circuitry to at least one of control and perform a method of operating a radio node in a wireless communication network, the method comprising:
communicating utilizing signaling, the communicating utilizing signaling being based on performing pulse-shaping pertaining to the signaling, the pulse-shaping pertaining to the signaling being based on a pulse-shaping indication, the pulse shaping indication comprising a signaling characteristic of a control channel being used for communications utilizing signaling between the radio node and at least one of a wireless device and a second node, the signaling characteristic of the control channel comprising at least one of a channel indication and a resource for the signaling, the signaling characteristic indicating a first pulse-shaping parameter and a second pulse-shaping parameter, the second pulse-shaping parameter indicating a bandwidth compression.

9. The radio node according to claim 2, wherein the pulse-shaping indication is transmitted by a network node.

10. The radio node according to claim 2, wherein the pulse-shaping indication is transmitted with control signaling, the control signaling including at least one of physical layer signaling and higher layer signaling.

11. The radio node according to claim 2, wherein the pulse-shaping indication is transmitted with control signaling indexing a table configured to the radio node.

12. The radio node according to claim 2, wherein the pulse shaping indication corresponds to a modulation indication indicating at least one of modulation and modulation order used for the signaling.

13. The radio node according to claim 2, wherein the pulse-shaping indication indexes one of a configured, a configurable and a predefined table indicating at least one of the first pulse-shaping parameter and the second pulse-shaping parameter.

14. The method according to claim 4, wherein the pulse-shaping indication is transmitted with control signaling indexing a table configured to the radio node.

15. The method according to claim 14, wherein the pulse shaping indication corresponds to a modulation indication indicating at least one of modulation and modulation order used for the signaling.

16. The method according to claim 14, wherein the pulse-shaping indication indexes one of a configured, a configurable and a predefined table indicating at least one of the first pulse-shaping parameter and the second pulse-shaping parameter.

17. The method according to claim 1, wherein the signaling comprises a plurality of subcarriers; and
the first pulse-shaping parameter corresponding to at least one of:
a bandwidth expansion;
a subset of the subcarriers, the subset being designated as pulse-shaped; and
a ratio of the subcarriers to be subject to filtering relative to a target bandwidth.

18. The method according to claim 1, wherein the first pulse-shaping parameter is configured to be a lower value for first modulation signaling than for second modulation signaling.

19. The radio node according to claim 2, wherein the signaling comprises a plurality of subcarriers; and
the first pulse-shaping parameter corresponding to at least one of:
a bandwidth expansion;
a subset of the subcarriers, the subset being designated as pulse-shaped; and
a ratio of the subcarriers to be subject to filtering relative to a target bandwidth.

* * * * *